Patented Mar. 15, 1949

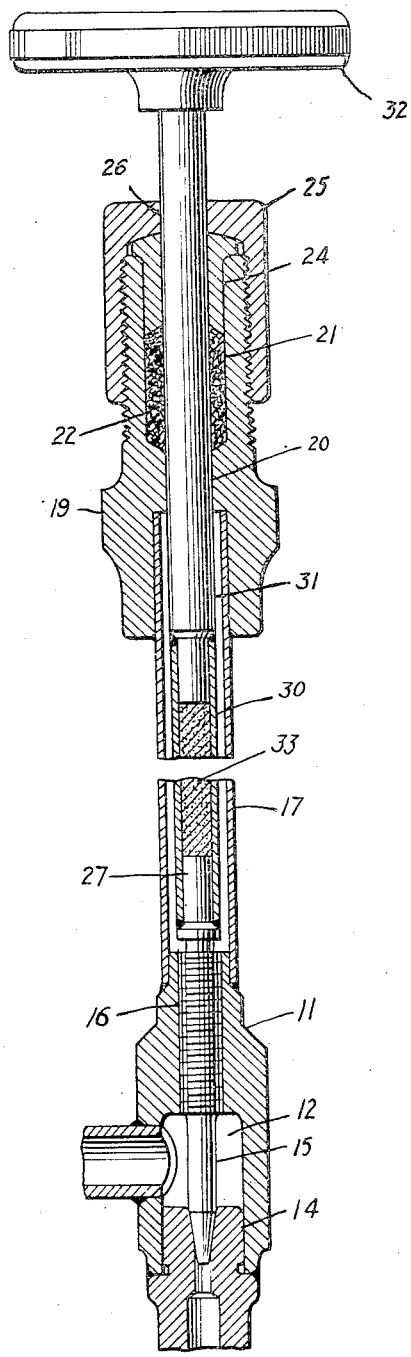

2,464,242

UNITED STATES PATENT OFFICE 2,464,242

VALVE

Cecil T. Lane, Upper Montclair, N. J., assignor to Specialties Development Corporation, Bloomfield, N. J., a corporation of New Jersey Application September 26, 1944, Serial No. 555,788

4 Claims. (Cl. 251—150)

1

The present invention relates to valves, and more particularly to valves having a very low heat conductivity.

The present invention aims to provide a valve adapted to be used in connection with controlling a fluid medium having a much higher or much lower temperature than the temperature of the ambient atmosphere to which the valve handle or operating means are exposed. For example, in connection with apparatus for liquefying air or separating liquid air into its constituents, the temperature of the controlled medium may be about —305° F. and the ambient atmospheric temperature may be about 95° F. or more, there thus being a difference in temperature of about 400° F.

Accordingly, an object of the present invention is to provide an improved valve for controlling the flow of fluid medium having a temperature substantially different than the ambient atmosphere.

Another object is to provide a valve which is especially adapted for controlling the flow of fluid medium having extremely low temperatures.

Another object is to provide a valve of the foregoing character which is simple in design, light in weight, has a low heat conductivity and greatly minimizes heat losses.

A further object consists in the combination and arrangement of parts, and the selection of materials of which the parts are constructed.

Other and further objects of the invention will be obvious upon an understanding of the illustrative embodiment about to be described, or will be indicated in the appended claims, and various advantages not referred to herein will occur to one skilled in the art upon employment of the invention in practice.

An embodiment of the invention has been chosen for purposes of illustration and description and is shown in the accompanying drawing, forming a part of the specification, wherein the figure is a longitudinal sectional view of a valve, illustrating an embodiment of the invention.

Referring to the drawing, there is shown a valve which, for purposes of illustration, may be an expansion valve adapted to be used in a system for expanding liquid air to reduce the temperature thereof to about —305° F. or lower.

The valve comprises a valve body or housing 11 having a chamber 12 therein provided with a valve seat 14 at its inlet, and a valve member 15 threadedly disposed in the valve body at 16 for movement into and out of seating position with respect to the seat. The seat and valve member illustrated herein are of the needle type and are arranged to effect expansion of fluid medium as it enters the valve chamber.

A hollow tubular elongated sleeve or casing member 17, preferably circular in cross-section,

2 has one end thereof secured to the valve body 11. At the other end of the casing member 17, there is secured a closure body 19 having a longitudinal bore 20 provided with an enlarged portion 21 for receiving a packing 22 and a follower 24 for retaining the packing. A cap or nut 25 having a centrally located aperture 26 in the top thereof is threadedly attached to the outward end of the closure body to urge the follower towards the packing.

In order to facilitate rotation of the valve member 15 to move the same into and out of seating position with respect to the valve seat, a portion 27 thereof extends outwardly of the valve body and into the casing member 17, and has one end of a hollow tubular elongated valve stem 30 secured thereto. The valve stem extends longitudinally and coaxially through the casing member for substantially the entire length thereof. At the other end of the stem 30, a stem portion 31 is secured which extends through the bore 20 of the closure body 19, the packing 22, the follower 24 and the aperture 26 of the cap 25, and has a portion disposed outwardly of the closure body for attaching a handwheel 32 or other suitable valve operating means.

It will be appreciated that the stem portion 31 could be threadedly disposed in the bore 20 of the closure body 19 for effecting movement of the valve member 15 with respect to its seat, instead of providing the threaded connection at 16.

In practice, the foregoing described valve usually is arranged with the valve body 12 within the interior of the apparatus and with the elongated casing member extending through a jacket of insulation enclosing the apparatus, the handwheel being at the exterior of the jacket and being exposed to the atmosphere.

It has been found that the valve operates most satisfactorily when the packing 22 is not exposed to extremely cold temperatures. Thus, by locating the packing at the outer end of the valve, the packing will only be subjected to cold conducted by the casing member 17 and valve stem 30 from the valve body 11. Preferably, the length of the casing member is at least ten times its diameter, thereby spacing the valve body and packing a substantial distance.

It further has been found that heat losses and the conduction of heat or cold can further be minimized by constructing the casing member 17 and the valve stem 30 of relatively thin tubing. Also, the inner diameter of the casing member should be only slightly greater than the outer diameter of the valve stem, whereby the space between the casing member and the valve stem is very small and convection currents in the space are practically eliminated.

Preferably, the tubing is formed of material having poor heat conducting properties. Such material may be stainless steel of the nickel-chromium type which has the lowest heat conductivity of any known metal of its type, has high tensile and torsion strength, has maximum strength for a minimum weight, and has the property of maintaining its strength at extremely low temperatures, for example in the neighborhood of about −300° F.

The valve body 11, the valve member 15, the stem portion 31, and the closure body 19 likewise may be constructed of stainless steel to reduce conduction or flow of heat. By making the valve body and valve member of stainless steel, it was found that the threaded connection at 16 works without lubrication even at extremely low temperature.

If desired, the heat losses through the valve may be further reduced by filling the valve stem with a suitable insulating material indicated at 33. It has been found that excellent results are attainable by using a finely divided insulating material of the aerogel type which has very high thermal insulating properties and prevents the flow of convection currents.

From the foregoing description, it will be seen that the present invention provides an improved valve having a low heat conductivity and thereby effecting a substantial saving in heat losses. In practice it was found that a valve constructed in accordance with the present invention had a heat loss of only five B. t. u. an hour, or less, while controlling the flow of liquid air at about −305° F. Under these conditions, there was no sensation of cold at the handwheel, the temperature of the handwheel being substantially the same as the temperature of the surrounding atmosphere. The valve is rugged in construction and can readily withstand any rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A valve of the class described, comprising a valve housing forming a chamber provided with a valve seat, a valve member for said seat, an elongated valve stem for moving said valve member into and out of seating position with respect to said seat, an elongated tubular casing member, having one end secured to said valve housing and encasing a portion of said valve stem, said casing member having an inner diameter slightly greater than the outer diameter of said valve stem, a closure body secured to the other end of said casing member, said diameters defining a heat insulating chamber around said stem extending from a position in said closure body to a position short of said chamber and means for operating said valve stem disposed outwardly of said closure body, said valve stem and said casing member being formed of a material having a low heat conductivity.

2. A valve of the class described, comprising a valve body provided with a valve seat, a valve member for said seat, an elongated valve stem for moving said valve member into and out of seating position with respect to said seat and having a tubular portion, an elongated tubular casing member having one end secured to said valve body and encasing a portion of said valve stem, a closure body secured to the other end of said casing member, said tubular portion and said tubular casing member providing a defined heat insulating space around said tubular portion, means for operating said valve stem disposed outwardly of said closure body, and means for preventing the flow of convection air currents including heat insulating material in said valve stem.

3. A valve of the class described, comprising a valve body provided with a valve seat, a valve member for said seat, an elongated valve stem for moving said valve member into and out of seating position with respect to said seat and having a tubular portion, means for preventing the flow of convection air currents including heat insulating material in said valve stem, an elongated tubular casing member, having one end secured to said valve body and encasing a portion of said valve stem, the inner diameter of said casing member being greater than the outer diameter of said valve stem to provide a defined heat insulating space around said tubular portion, a closure body secured to the other end of said casing member, and means for operating said valve stem disposed outwardly of said closure body, said valve stem and said casing member being formed of a material having a low heat conductivity.

4. A valve of the class described, comprising a valve housing forming a chamber provided with a valve seat, a valve member for said seat, an elongated tubular valve stem for moving said valve member into and out of seating position with respect to said seat, an elongated tubular casing member, having one end secured to said valve housing and encasing a portion of said valve stem, said casing member having an inner diameter slightly greater than the outer diameter of said valve stem, a closure body secured to the other end of said casing member, said diameters defining a heat insulating chamber around said stem extending from a position in said closure body to a position short of said chamber, and means for operating said valve stem disposed outwardly of said closure body, said valve stem and said casing member being formed of a material having a low heat conductivity.

CECIL T. LANE.

REFERENCES CITED

The following references are of record in the file of this patent:

UNITED STATES PATENTS

| Number | Name | Date |
|---|---|---|
| 723,832 | Cook | Mar. 31, 1903 |
| 1,443,231 | McCauley | Jan. 23, 1923 |
| 1,557,785 | Shepherd | Oct. 20, 1925 |
| 1,601,274 | Warrington | Sept. 28, 1926 |
| 1,716,195 | Stockstrom | June 4, 1929 |
| 2,037,911 | Larson | Apr. 21, 1936 |
| 2,062,781 | De Baufre | Dec. 1, 1936 |